United States Patent [19]
Grossett

[11] 3,760,858
[45] Sept. 25, 1973

[54] PNEUMATIC TIRES
[75] Inventor: Alfred Harry Grossett, Warley, England
[73] Assignee: Dunlop Holdings Limited, London, England
[22] Filed: Sept. 27, 1971
[21] Appl. No.: 183,805

[30] Foreign Application Priority Data
Feb. 10, 1970 Great Britain.................. 46,860/70

[52] U.S. Cl. .............................................. 152/361
[51] Int. Cl. ............................................. B60c 9/08
[58] Field of Search .................................... 152/361

[56] References Cited
UNITED STATES PATENTS
3,481,386 12/1969 Menell et al........................ 152/361
3,543,828 12/1970 Colombes et al.................... 152/361
3,580,318 5/1971 Menell et al........................ 152/361

Primary Examiner—James B. Marbert
Attorney—Richard K. Stevens et al.

[57] ABSTRACT

A pneumatic tire having a radial ply carcass and a sidewall reinforcing ply in at least one sidewall of the tire. The sidewall reinforcing ply may be a direct continuation of the carcass ply turn-up or a separate ply, overlapping the turn-up. The sidewall reinforcing ply may extend to the remote side of the tire breaker assembly either under or over the breaker assembly or between two layers thereof. The sidewall reinforcing ply may be of cranked form.

19 Claims, 5 Drawing Figures

PNEUMATIC TIRES

This invention relates to pneumatic tires, particularly, but not exclusively, to earthmover tires, and it is an object of the present invention to provide novel constructions of such tires.

This pneumatic tire comprises a carcass ply, two bead regions, the carcass ply extending from one bead region of the tire to the other, a breaker assembly comprising at least one breaker layer and a sidewall reinforcing ply which is either a continuation of or separate from a turn up of the carcass ply located in at least one of the two sidewalls of the tire axially outwardly of the carcass ply and extending from the bead region of the tire, said sidewall ply having cords which extend substantially radially of the tire for the whole or for a substantial proportion of the whole of their lengths, the radially outermost edge of the sidewall reinforcing ply lying between a radial distance ($h$ min.) of 0.7H from the radially outermost extremity of the flange of the wheel on which the tire is to be mounted, in the normally inflated but unloaded state of the tire, and the edge of the breaker assembly remote from the sidewall in which the sidewall reinforcing ply is located, H being the radial distance between the radially outermost extremity of the flange of the wheel on which the tire is to be mounted and the interior of the tire at its mid-circumferential plane, wherein either the sidewall ply is of cranked form, the portion of the ply which lies radially inwards of the widest part of the tire having radially extending cords while for the remainder of the ply the ply cords extend at an angle of between 50° and 90° to a circumference of the tire, the change of angle occurring on a circumference which lies at the widest point of the tire or radially outwards thereof, or the radially outer edge of the sidewall ply overlaps the breaker assembly and is positioned radially outwardly of the breaker assembly or between two layers of the breaker assembly, or two sidewall plies separate from the carcass ply are provided, one in each sidewall, the cords of the sidewall plies extending radially for the whole of their lengths.

The radial distance ($h$) of the radially outermost edge of the sidewall reinforcing ply from the radially outermost extremity of the rim flange preferably does not exceed 1.05 H ($h$ max).

The cranking i.e., change in angle, preferably takes place in the region between a distance of 0.7H radially outwards of the wheel flange on which the tire is to be mounted and the aforementioned remote edge of the breaker assembly.

When the sidewall reinforcing ply overlaps the breaker assembly it may extend to a position laterally, i.e., approximately axially, inwards from the edge of the widest breaker layer to end at a distance up to one third of the width of the widest breaker layer from said edge.

Alternatively, if extra stiffness is required across the full width of the breaker assembly the sidewall reinforcing ply may extend laterally across the full width of the widest breaker layer to the remote edge thereof.

In tire constructions where the sidewall reinforcing ply is separate from a carcass ply the sidewall reinforcing ply may be disposed axially outwardly or, preferably, axially inwardly, of the turn-up, with its radially innermost extremity positioned immediately adjacent the associated tire bead core. The carcass ply turn-up may extend radially outwards so that its radially outermost extremity lies at a radial distance ($h_1$) radially outwards of the radially innermost extremity of the bead core in the range $0.05H_1$ to $0.5H_1$, where $H_1$ is the radial distance between the radially innermost extremity of the bead core and the interior of the tire at its mid-circumferential plane. The sidewall reinforcing ply may consist of cords of the same material and construction and having the same properties as the cords of the carcass ply, but may be different. For example, in preferred tire constructions the cords of the sidewall reinforcing ply have an extension at break in the range 5 to 25 percent compared to the cords of the carcass ply which have a substantially lower value, of the order of 2 percent.

In tire constructions according to the invention where the sidewall reinforcing ply is a direct continuation of a carcass ply turn-up, and additional ply may be provided in at least one of the tire sidewalls contiguous with the sidewall reinforcing ply. The radially inner extremity of this additional ply lies between the radially innermost extremity of the bead core and a radial distance $0.05H_1$ therefrom and the radially outer extremity lies at a radial distance between $0.05H_1$ and $0.05H_1$ radially outwards of the radially innermost extremity of the bead core.

In some tire constructions in accordance with the invention the thickness of rubber between the sidewall reinforcing ply and the carcass ply may remain substantially constant from the mid-sidewall region of the tire to a region radially inwards of the breaker edge assembly. However, the plies (or the two parts of the same ply in constructions where the sidewall reinforcing ply is a continuation of the carcass ply turn-up) may alternatively be arranged in close-coupled relationship, the thickness of rubber between the two plies decreasing gradually from the mid-sidewall region radially outwards towards the breaker assembly.

Three embodiments of the invention, each consisting of a giant tire for use on earthmover vehicles and having a steel core carcass, will now be described by way of example with reference to the accompanying drawings of which:

Figure 1:
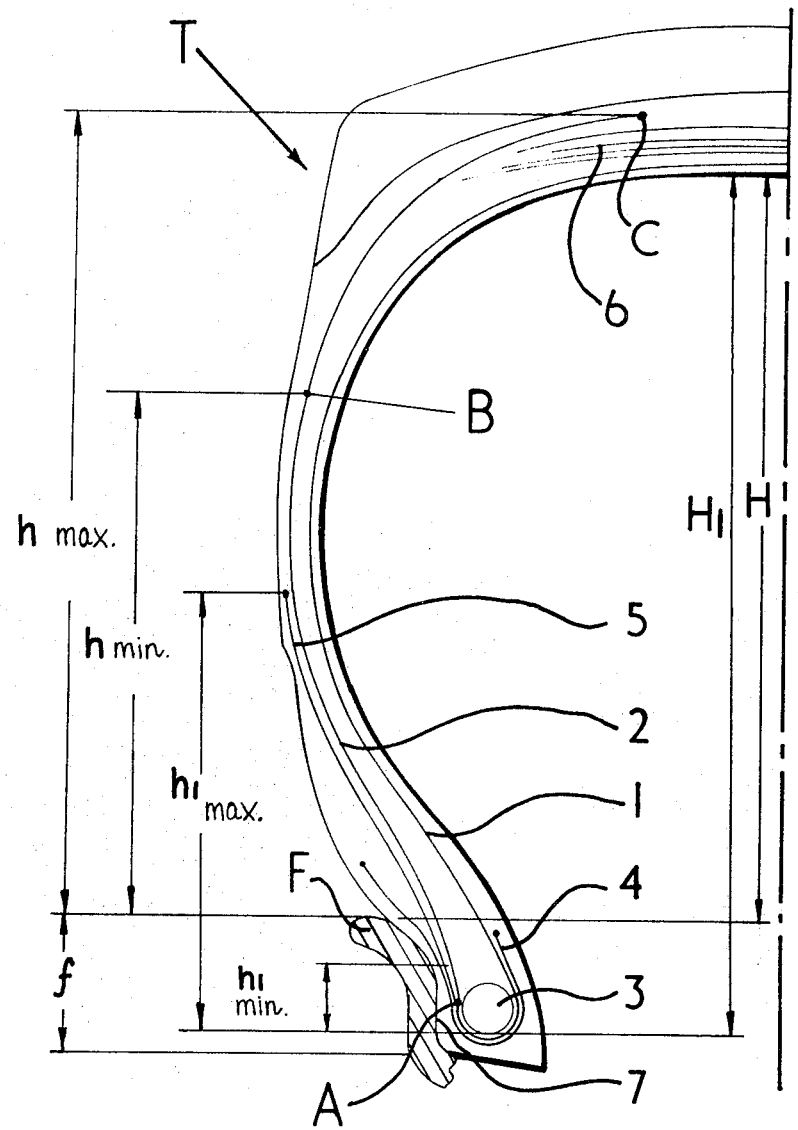
FIG. 1 shows a half section of a tire according to the first embodiment.

The tire T of the first embodiment illustrated in FIG. 1 comprises a carcass having a single ply 1 of radially extending steel cords each consisting of 28 spirally wrapped steel filaments each having a diameter of 0.0086 inches, the turn-ups 5 of which extend radially outwards to end at a distance $h_1$ max. equal to $0.5H_1$ radially outwards from the radially innermost extremity of the bead core 3.

A sidewall reinforcing ply 2 comprising steel cords each consisting of 21 steel filaments each having a diameter of 0.0086 inches is provided in each sidewall of the tire T extending on the axially inward side of the carcass ply turn-up 5 from a position A immediately adjacent to and axially outwards of the bead core 3 radially outwardly to end at a position C radially outwardly of the four breaker layers 6 adjacent the tire tread, a radially measured distance h max. equal to 1.05H from the radially outermost edge of the flange 7 of the wheel on which the tire is mounted in use. The extensibility at break of the cords of the sidewall ply is 7 percent.

The sidewall reinforcing ply 2 extends laterally inwards from the edge of the widest breaker layer (the radially innermost one) so that the position of its radially outermost and axially innermost edge C is located a distance approximately one quarter of the width of the widest breaker layer inwards of the edge of said layer.

A filler strip 4 consisting spirally wrapped steel cords each consisting of 39 filaments each having a diameter of 0.0058 inches is provided in each bead region of the tire to embrace both that part of the carcass ply 1 curving around the bead core 3 and the radially innermost extremity A of the sidewall reinforcing ply, the two edges of the filler strip 4 extending radially outwardly from the bead region of the tire on the axially inner and outer sides thereof respectively.

As a modification to the embodiment just described the sidewall reinforcing ply 2 may be cranked at position B located in the sidewall a radial distance h min. equal to 0.7H from the radially outermost extremity of the wheel flange F, so that the cords in the sidewall reinforcing ply 2 between positions B and C are inclined at angles of between 50° and 90° to a tire circumference, for example 68°.

Figure 2:
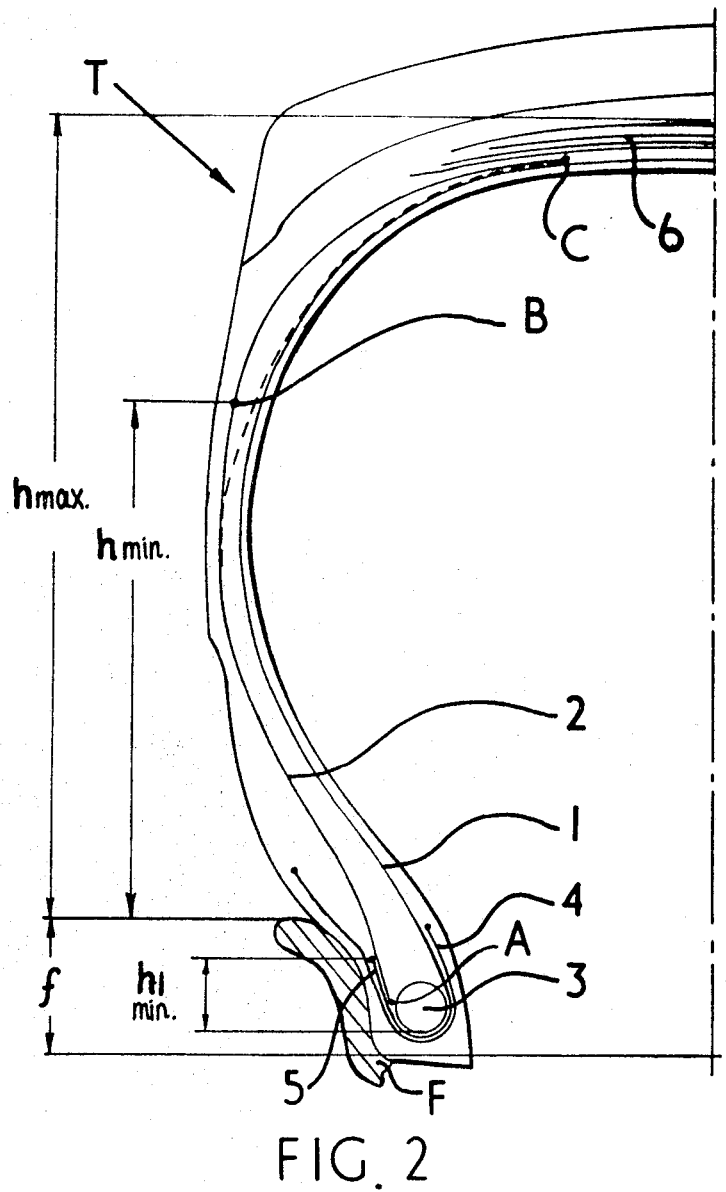
FIG. 2 shows a half section of a tire according to the second embodiment.
Figure 3:
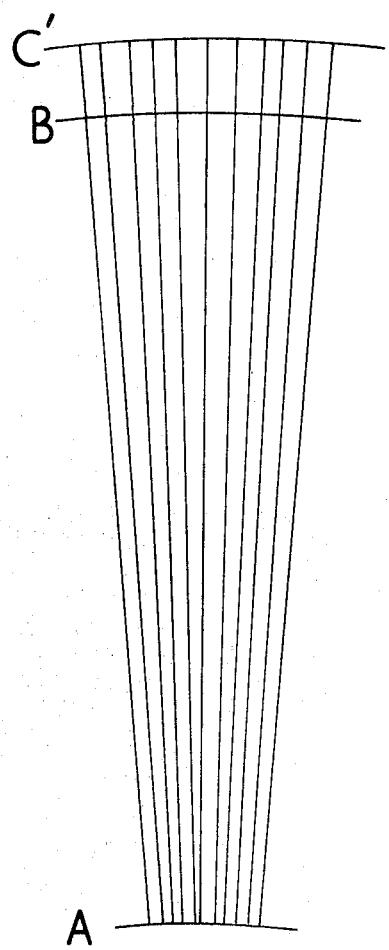
FIG. 3 shows a partial side-view of the carcass of the tire illustrated in FIG. 2.

The tire T of the second embodiment illustrated in FIGS. 2 and 3 is a 18.00 × 25 tire which is similar to the tire of the first embodiment in that it comprises a carcass of a single ply 1 of radially extending steel cords the same as the cords of the carcass ply of the tire of the first embodiment. However, the turn-up 5 of the carcass ply ends at a radially measured distance $h_1$ min. equal to $0.05H_1$ radially outwardly of the radially innermost extremity of the bead core.

A sidewall reinforcing ply 2 containing steel cords each consisting of 21 filaments each having a diameter of 0.0086 inches, the cord extensibility at break being 7 percent is provided in each sidewall of the tire T extending from a radially innermost position A immediately adjacent the bead core 3 on the axially inward side of the carcass ply turn-up 5 to a radially outermost position $C^1$ immediately radially inwards of i.e., "underneath," the radially innermost of four breaker layers 6 adjacent the tire tread. The cords of the sidewall ply 2 extend radially for the whole of their lengths. The radially outermost position $C^1$ of the sidewall reinforcing ply is located axially inwards from the edge of the widest breaker layer (the radially innermost) at a distance equal to one quarter of the width thereof.

The sidewall reinforcing ply 2 is spaced apart from the carcass ply 1, by a layer of rubber sandwiched between these two plies, the layer of rubber being 4 mm to 8 mm thick in the mid-sidewall region and reducing in the tire shoulders near the edges of the breaker layers, and increasing in the lower sidewall adjacent the bead regions.

A filler layer 4 containing spirally wrapped steel cords each consisting of 39 filaments each having a diameter of 0.0056 inches is provided in the bead regions of the tire to embrace the bead core 3 and the adjacent parts of the carcass ply and sidewall reinforcing ply in a manner similar to the filler layer of the tire in the first embodiment.

In a modification of this embodiment the sidewall reinforcing ply 2 and the carcass ply 1 are arranged in close-coupled relationship, the thickness of rubber sandwiched between these two plies reducing gradually from the mid-sidewall region of the tire to position $C^1$. This modification is illustrated in FIG. 2, the radially outer part of the sidewall ply lying in a position shown by the dotted line.

Figure 4:
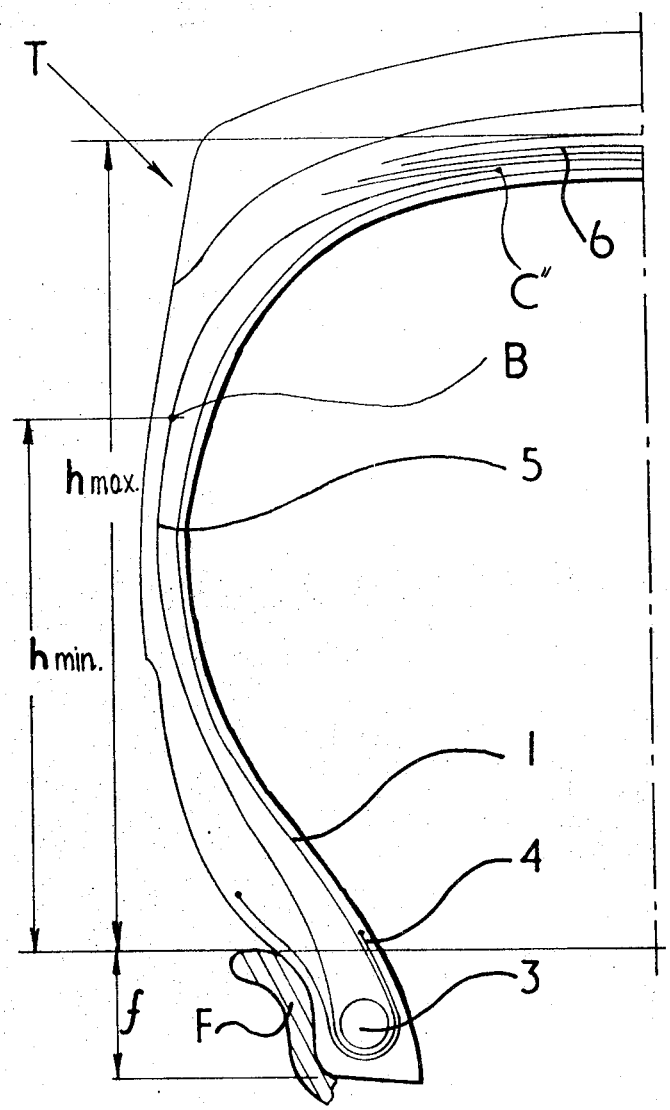
FIG. 4 shows a half section through a tire according to the third embodiment.
Figure 5:
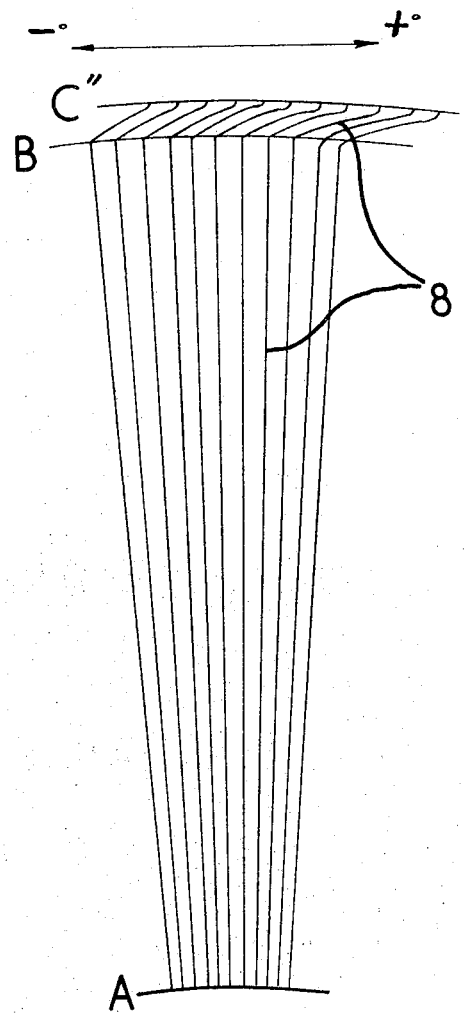
FIG. 5 shows a partial side-view of the carcass of the tire illustrated in FIG. 4.

The tire T of the third embodiment illustrated in FIGS. 4 and 5 comprises a carcass of a single ply 1 of radially extending spirally wrapped steel cords each consisting of 28 filaments each 0.0086 inches diameter, the turn-ups of this carcass ply around the bead core 3 extending radially outwards therefrom to form the sidewall reinforcing ply 5 and end at a position $C''$ radially inwardly of i.e., "underneath" the radially innermost of four breaker layers 6 provided adjacent the tire tread. The position $C''$ corresponds to position $C^1$ in FIGS. 2 and 3.

As can be seen in FIG. 5 the cords 8 of the sidewall reinforcing ply between the positions B and C are cranked so as to be inclined at an angle of 68° to a tire circumference in a positive direction with respect to the rotation of the tire. The cords in the sidewall reinforcing ply in the other sidewall of the tyre are cranked at the same angle and in the same direction as those in the first ply so that the cords in the cranked regions of the two plies extend in the same direction when the tire is viewed in plan.

In other respects the tire of this embodiment is similar to the tire of the second embodiment.

Tires in accordance with the invention have the advantage over known tires that the properties and in particular the flexibility or stiffness of the sidewall can be controlled more readily to meet various specific requirements. Variations in flexibility may be introduced by varying the length, i.e., the radially outward extent, of the ply, the cord angle of a cranked ply, the thickness of the rubber layer between sidewall ply and carcass ply and the modulus and hardness of this rubber layer.

Having now described my invention, what I claim is:

1. A pneumatic tire comprising a tread portion, two sidewalls, two bead regions, a carcass ply extending from one bead region of the tire to the other which in the tread portion of the tire is disposed substantially at 90° to the mid-circumferential plane, a breaker assembly comprising at least one breaker layer and a sidewall reinforcing ply which is either a continuation of or separate from a turn up of the carcass ply around a bead region of the tire located in at least one of the two sidewalls of the tire axially outwardly of the carcass ply and extending from the bead region of the tire, the radially outermost edge of the sidewall reinforcing ply lying between a radial distance ($h$ min) of 0.7 H from the radially outermost extremity of the flange of the wheel on which the tire is to be mounted, in the normally inflated but unloaded state of the tire, and the edge of the breaker assembly remote from the sidewall in which the sidewall reinforcing ply is located, H being the radial distance between the radially outermost extremity of the flange of the wheel on which the tire is to be mounted and the interior of the tire at its mid-circumferential plane, wherein the sidewall reinforcing ply is of cranked form, the portion of the ply which lies radially inwards of the widest part of the tire having radially extending cords while for the remainder of the ply and ply cords extend at an angle of between 50° and 90° to a circumference of the tire, the change of angle occurring on a circumference which lies at the widest part of the tire or radially outwards thereof.

2. A pneumatic tire according to claim 1 wherein the radial distance ($h$) of the radially outermost edge of the sidewall reinforcing ply from the radially outermost extremity of the rim flange does not exceed 1.05H ($h$ max).

3. A pneumatic tire according to claim 1 wherein the sidewall reinforcing ply overlaps the breaker assembly and extends to a position laterally inwards from the edge of the widest breaker layer to end at a distance up to one third of the width of the widest breaker layer from said edge.

4. A pneumatic tire according to claim 1 wherein the sidewall reinforcing ply extends laterally across the full width of the widest breaker layer to the remote edge thereof.

5. A pneumatic tire according to claim 1 wherein the thickness of rubber between the sidewall reinforcing ply and the carcass ply remains substantially constant from the mid-sidewall region of the tire to a region radially inwards of the breaker assembly edge.

6. A pneumatic tire according to claim 1 wherein the thickness of rubber between the sidewall reinforcing ply and the carcass ply decreases gradually from the mid-sidewall region radially outwards towards the breaker assembly.

7. A pneumatic tire according to claim 1 having a sidewall ply of cranked form wherein the change in cord angle takes place in the region between a distance of 0.7H radially outwards of the wheel flange on which the tire is to be mounted and the remote edge of the breaker assembly.

8. A pneumatic tire according to claim 1 having a sidewall ply separate from a carcass ply wherein the sidewall reinforcing ply is disposed axially inwards of the carcass ply turn-up.

9. A pneumatic tire according to claim 1 having a sidewall ply separate from a carcass ply wherein the sidewall reinforcing ply is disposed axially outwards of the carcass ply turn-up.

10. A pneumatic tire according to claim 1 having a sidewall reinforcing ply separate from a carcass ply wherein the carcass ply turn-up extends radially outwards so that its radially outermost extremity lies at a radial distance ($h_1$) radially outwards of the radially innermost extremity of the bead core in the range $0.05H_1$ to $0.5H_1$, where $H_1$ is the radial distance between the radially innermost extremity of the bead core and the interior of the tire at its mid-circumferential plane.

11. A pneumatic tire according to claim 1 having a sidewall reinforcing ply separate from a carcass ply wherein the cords of the sidewall reinforcing ply have properties different from those of the cords of the carcass ply.

12. A pneumatic tire according to claim 1 having a sidewall reinforcing ply separate from a carcass ply wherein the cords of the sidewall reinforcing ply have properties which are the same as those of the cords of the carcass ply.

13. A pneumatic tire according to claim 1 having a sidewall reinforcing ply separate from a carcass ply wherein the cords of the sidewall reinforcing ply have an extension at break in the range 5 to 25 percent compared to the cords of the carcass ply which have a substantially lower value of the order of 2 percent.

14. A pneumatic tire according to claim 13 wherein the cords of the sidewall reinforcing ply have an extension at break of 7 percent.

15. A pneumatic tire according to claim 1 having a sidewall reinforcing ply which is a direct continuation of a carcass ply turn-up wherein an additional ply is provided in at least one of the tire sidewalls contiguous with the sidewall reinforcing ply.

16. A pneumatic tire according to claim 15 wherein the radially inner extremity of the additional ply lies between the radially innermost extremity of the bead core and a radial distance $0.05H_1$ therefrom.

17. A pneumatic tire according to claim 15 wherein the radially outer extremity lies at a radial distance between $0.05H_1$ and $0.5H_1$ radially outwards of the radially innermost extremity of the bead core.

18. A pneumatic tire according to claim 1 wherein the radially outer edge of the sidewall reinforcing ply over-laps the breaker assembly and is positioned radially outwardly of the breaker assembly or between two layers of the breaker assembly.

19. A pneumatic tire according to claim 1 wherein the carcass ply extends radially for the whole of its length.

\* \* \* \* \*

UNITED STATES PATENT OFFICE
CERTIFICATE OF CORRECTION

Patent No. 3,760,858  Dated September 25, 1973

Inventor(s) ALFRED H. GROSSETT

It is certified that error appears in the above-identified patent and that said Letters Patent are hereby corrected as shown below:

Column 2, line 16, change "and" to --an--.

Signed and sealed this 7th day of May 1974.

(SEAL)
Attest:

EDWARD M. FLETCHER, JR.
Attesting Officer

C. MARSHALL DANN
Commissioner of Patents